United States Patent
Smith

(10) Patent No.: US 8,903,172 B2
(45) Date of Patent: *Dec. 2, 2014

(54) IMAGING TERMINAL OPERATIVE FOR DECODING

(71) Applicant: Honeywell International, Inc., Fort Mill, SC (US)

(72) Inventor: Taylor Smith, Charlotte, NC (US)

(73) Assignee: Honeywell International, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/015,220

(22) Filed: Aug. 30, 2013

(65) Prior Publication Data

US 2014/0166757 A1    Jun. 19, 2014

Related U.S. Application Data

(63) Continuation of application No. 13/298,723, filed on Nov. 17, 2011, now Pat. No. 8,526,720.

(51) Int. Cl.
*G06K 9/36* (2006.01)
*G06K 7/10* (2006.01)
*G06K 7/12* (2006.01)

(52) U.S. Cl.
CPC .............. *G06K 7/12* (2013.01); *G06K 7/10722* (2013.01); *G06K 7/10821* (2013.01)
USPC ............................ 382/166; 382/162; 382/233

(58) Field of Classification Search
USPC ................. 382/162, 163, 166, 176, 260, 233; 235/462.01, 469, 454, 472.01, 462.45; 348/222.1, 223.1, 272, 294, 239, 348/E5.024, E5.027, E5.051

See application file for complete search history.

(56) References Cited

U.S. PATENT DOCUMENTS

| | | | |
|---|---|---|---|
| 5,576,528 A | 11/1996 | Chew et al. |
| 6,246,471 B1 | 6/2001 | Jung et al. |
| 6,375,075 B1 | 4/2002 | Sprague et al. |
| 6,414,750 B2 | 7/2002 | Jung et al. |
| 6,417,917 B1 | 7/2002 | Jung et al. |
| 6,449,041 B1 | 9/2002 | Jung et al. |
| 6,478,223 B1 | 11/2002 | Ackley |
| 6,832,729 B1 | 12/2004 | Perry et al. |
| 6,902,113 B2 | 6/2005 | Sali et al. |
| 7,051,935 B2 | 5/2006 | Sali et al. |
| 7,055,746 B2 | 6/2006 | MacKay et al. |
| 7,069,186 B2 | 6/2006 | Jung et al. |
| 7,118,041 B2 | 10/2006 | Taylor |
| 7,210,631 B2 | 5/2007 | Sali et al |
| 7,365,854 B2 | 4/2008 | Garon |

(Continued)

*Primary Examiner* — Anh Do
(74) *Attorney, Agent, or Firm* — Additon, Higgins & Pendleton, P.A.

(57) ABSTRACT

There is set forth herein an imaging terminal operative for decoding of bar codes. In one embodiment the terminal can include a color imaging assembly having a color image sensor array. The terminal can be operative for capture of a color frame of image data. Responsively to the capture of the color frame of image data the terminal can convert the color image data to monochrome image data while maintaining the color image data. The terminal can utilize the monochrome image data to search for a color bar code finder pattern. The terminal can be operative so that if the color bar code pattern is found utilizing the monochrome image data the terminal can utilize the color image data for attempting to decode a color bar code.

6 Claims, 7 Drawing Sheets

(56) References Cited

U.S. PATENT DOCUMENTS

| | | | |
|---|---|---|---|
| 7,770,799 B2 * | 8/2010 | Wang | 235/472.01 |
| 7,780,089 B2 * | 8/2010 | Wang | 235/462.45 |
| 7,913,922 B1 | 3/2011 | Roth | |
| 8,002,188 B2 * | 8/2011 | Wang | 235/462.45 |
| 8,006,911 B2 | 8/2011 | Yi et al. | |
| 8,196,839 B2 * | 6/2012 | Wang | 235/472.01 |
| 8,218,027 B2 | 7/2012 | Wang | |
| 8,256,720 B2 * | 9/2012 | Ikeda | 244/204.1 |
| 8,345,117 B2 | 1/2013 | Wang | |
| 8,526,720 B2 | 9/2013 | Smith | |
| 2001/0038451 A1 | 11/2001 | Jung et al. | |
| 2003/0016359 A1 | 1/2003 | Jung et al. | |
| 2005/0023354 A1 | 2/2005 | Sali et al. | |
| 2005/0029355 A1 | 2/2005 | Sali et al. | |
| 2005/0194444 A1 | 9/2005 | Gieske | |
| 2005/0236484 A1 | 10/2005 | Taylor | |
| 2005/0254067 A1 | 11/2005 | Gaon | |
| 2006/0027662 A1 | 2/2006 | Baradi | |
| 2006/0144947 A1 | 7/2006 | Sali et al. | |
| 2007/0125870 A1 | 6/2007 | Mase et al. | |
| 2008/0000091 A1 | 1/2008 | Yin et al. | |
| 2008/0000991 A1 | 1/2008 | Yin et al. | |
| 2010/0195902 A1 | 8/2010 | Horovitz | |
| 2010/0231994 A1 | 9/2010 | Kashibuchi et al. | |
| 2011/0186632 A1 | 8/2011 | Yi et al. | |

* cited by examiner

IMAGING TERMINAL OPERATIVE FOR DECODING

CROSS REFERENCE TO RELATED APPLICATIONS

This application is a continuation of U.S. patent application Ser. No. 13/298,723 filed Nov. 17, 2011 entitled, "Imaging Terminal Operative for Decoding." The above application is incorporated herein by reference in its entirety.

FIELD OF THE INVENTION

The present invention relates to registers in general and specifically to an optical based register.

BACKGROUND OF PRIOR ART

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button (trigger) that can be actuated by an index finger. Indicia reading terminals having keyboards and displays are also available. Keyboard and display equipped indicia reading terminals are commonly used in shipping and warehouse applications. In a keyboard and display equipped indicia reading terminal, a trigger button for actuating the output of decoded messages is typically provided in such locations as to enable actuation by a thumb of an operator. Keyboard and display equipped indicia reading terminals are available in a form in which the keyboard and display are commonly provided by a display having an associated touch panel. Indicia reading terminals in a form devoid of a keyboard and display or in a keyboard and display equipped form are commonly used in a variety of data collection applications including point of sale applications, shipping applications, warehousing applications, security check point applications, and patient care applications. Some indicia reading terminals are adapted to read bar code symbols including one or more of one dimensional (1D) bar codes, stacked 1D bar codes, and two dimensional (2D) bar codes. Other indicia reading terminals are adapted to read OCR characters while still other indicia reading terminals are equipped to read both bar code symbols and OCR characters.

SUMMARY OF THE INVENTION

There is set forth herein an imaging terminal operative for decoding of bar codes. In one embodiment the terminal can include a color imaging assembly having a color image sensor array. The terminal can be operative for capture of a color frame of image data. Responsively to the capture of the color frame of image data the terminal can convert the color image data to monochrome image data while maintaining the color image data. The terminal can utilize the monochrome image data to search for a color bar code finder pattern. The terminal can be operative so that if the color bar code pattern is found utilizing the monochrome image data the terminal can utilize the color image data for attempting to decode a color bar code.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

There is set forth herein an imaging terminal operative for decoding of bar codes. In one embodiment the terminal can include a color imaging assembly having a color image sensor array. The terminal can be operative for capture of a color frame of image data. Responsively to the capture of the color frame of image data the terminal can convert the color image data to monochrome image data while maintaining the color image data in memory. The terminal can utilize the monochrome image data to search for a color bar code finder pattern. The terminal can be operative so that if the color bar code pattern is found utilizing the monochrome image data the terminal can utilize the color image data for attempting to decode the color bar code.

An exemplary hardware platform suitable for supporting functioned attributes set forth herein is described with reference to FIG. 1.

Figure 1:
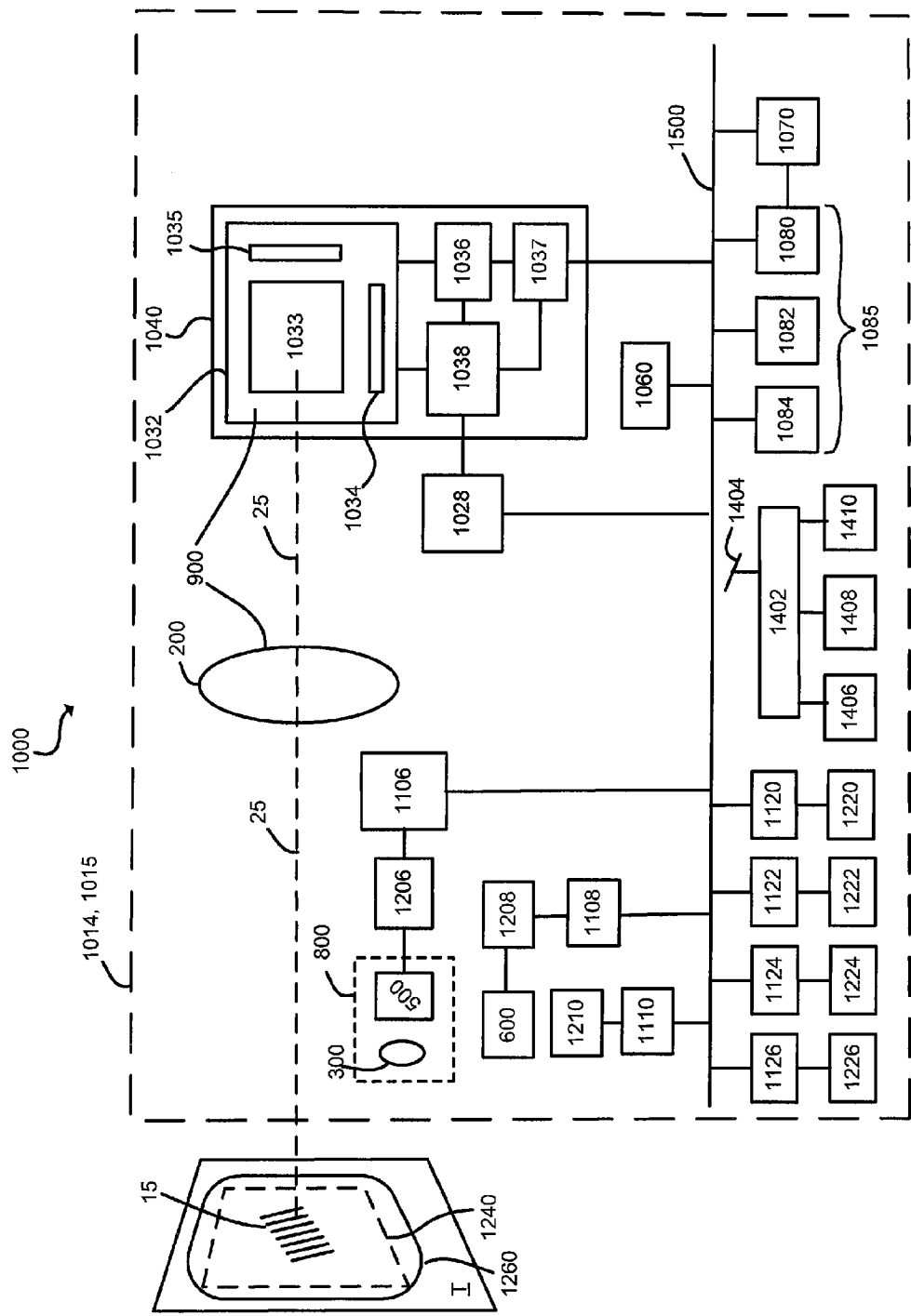
FIG. 1 is a block diagram of an indicia reading terminal.

There is set forth herein as shown in FIG. 1 an indicia reading terminal 1000 comprising an image sensor pixel array 1033 having a plurality of pixels, the plurality of pixels including a first set of pixels and a second set of pixels, the first set of pixels having wavelength selective filters transmitting light of a first wavelength, the second set of pixels having wavelength selective filters transmitting light of a second wavelength. Image sensor pixel array 1033 can also include a third set of pixels having wavelength selective filters transmitting light of a third wavelength. In one embodiment, the first set of pixels can be red pixels selectively transmitting light in the red color and the second set of pixels can be green pixels selectively transmitting light in the green color band. The third set of pixels can be blue pixels selectively transmitting light in the blue color band. The indicia reading terminal 1000 can include an optical imaging assembly 200 for focusing imaging light rays onto the image sensor pixel array, the optical imaging assembly 200 being adapted so that for light rays of the first wavelength the optical imaging assembly 200 has a first focus range and for light rays of the second wavelength the optical imaging assembly 200 has a second focus range.

Indicia reading terminal 1000 can include an image sensor 1032 comprising a multiple pixel image sensor pixel array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor pixel array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. Image sensor integrated circuit 1040 can incorporate fewer than the noted number of components. In one example, image sensor integrated circuit 1040 can be provided e.g., by an MT9V022 (752×480 pixel array) or an MT9V023 (752×480 pixel array) image sensor integrated circuit available from Micron Technology, Inc. In one example, image sensor pixel array 1033 can be a hybrid monochrome and color image sensor pixel array having a first subset of monochrome pixels without color filter elements and a second subset of color pixels having color sensitive filter elements. In one example, image sensor integrated circuit 1040 can incorporate a Bayer pattern filter, so that defined at the image sensor pixel array 1033 are red pixels at red pixel positions, green pixels at green pixel positions, and blue pixels at blue pixel positions. Image sensor pixel array can be an M column and N row (M×N) image sensor pixel array 1033. "Column" and "row" herein are regarded as arbitrary designations. Thus, a "column" according to a manufacturer of an image sensor pixel array 1033 can be regarded as either a "row" or "column" herein. Frames that are provided utilizing such an image sensor pixel array incorporating a Bayer pattern can include red pixel values at red pixel positions, green pixel values at green pixel positions, and blue pixel values at blue pixel positions. An imaging subsystem 900 of terminal 1000 can include image sensor pixel array 1033 and optical imaging assembly 200 for focusing imaging light rays onto image sensor pixel array 1033 of image sensor 1032.

In the course of operation of terminal 1000, image signals can be read out of image sensor 1032, converted, and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of terminal 1000, optical imaging assembly 200 can be adapted for focusing an image of a decodable indicia 15 located within a field of view 1240 on a substrate, T, onto image sensor pixel array 1033. A size in target space of a field of view 1240 of terminal 1000 can be varied in a number of alternative ways. A size in target space of a field of view 1240 can be varied, e.g., by changing a terminal to target distance, changing an optical imaging lens assembly setting, changing a number of pixels of image sensor pixel array 1033 that are subject to read out. Imaging light rays can be transmitted about imaging axis 25. Optical imaging assembly 200 can be adapted to be capable of multiple focus ranges and multiple planes of optimum focus (best focus distances). In one embodiment, optical imaging assembly 200 is a stationary optical imaging assembly devoid of a mechanism for changing a lens setting. In terminal 1000, different focus ranges can be yielded without changing of a lens setting of optical imaging assembly 200.

Figure 3:
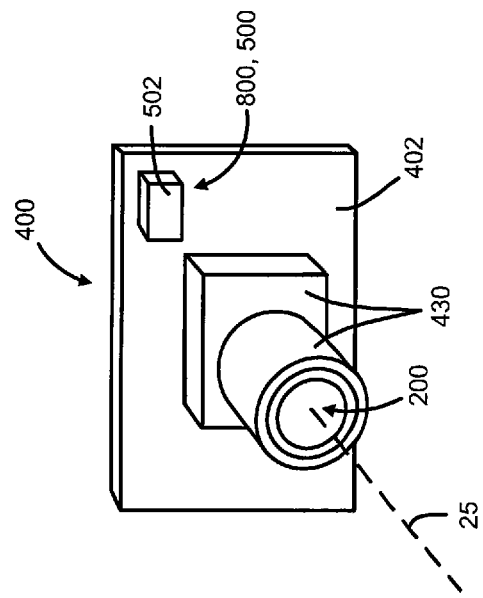
FIG. 3 is a perspective view of an exemplary imaging module.
Figure 2:
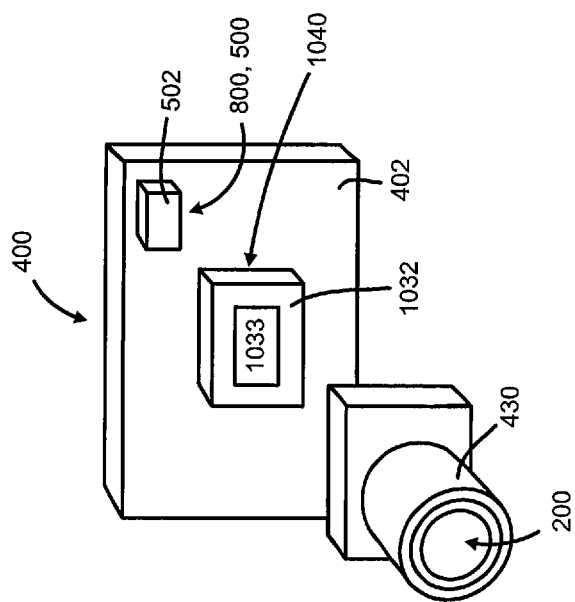
FIG. 2 is an exploded perspective view of an exemplary imaging module.

Terminal 1000 can include an illumination subsystem 800 for illumination of target, T, and projection of an illumination pattern 1260. Illumination pattern 1260, in the embodiment shown can be projected to be proximate to but larger than an area defined by field of view 1240, but can also be projected in an area smaller than an area defined by a field of view 1240. Illumination subsystem 800 can include a light source bank 500, comprising one or more light sources. A physical form view of an example of an illumination subsystem 800 is shown in FIGS. 2 and 3. As shown in FIGS. 2 and 3, an imaging module 400 can be provided having a circuit board 402 carrying image sensor 1032, that defines image sensor pixel array 1033, integrated circuit 1040 having an optical imaging assembly 200 disposed in support 430 disposed on circuit board 402. In the embodiment of FIGS. 2 and 3, illumination subsystem 800 has a light source bank 500 provided by single light source 502. In another embodiment, light source bank 500 can be provided by more than one light source. In one embodiment, illumination subsystem 800 can include, in addition to light source bank 500, an illumination lens assembly 300, as is shown in the embodiment of FIG. 1. In addition to or in place of illumination lens assembly 300 illumination subsystem 800 can include alternative light shaping optics, e.g. one or more diffusers, mirrors and prisms.

In one embodiment, one or more light source of light source bank 500 can emit light in the visible spectrum. In one embodiment, a one or more light source of light source bank 500 emits white light. Light source bank 500 can otherwise be configured to emit light in a wavelength range which in one embodiment exceeds 20 nm, in another embodiment 100 nm and in another embodiment 200 nm. In one embodiment, light source bank 500 can include first light source emitting light in a first visible color band and a second light source emitting light in a second visible color band so that a wavelength range of emitted light is delimited by the lower wavelength limit of the first visible color band and the higher wavelength limit of the second visible color band. Terminal 1000 can also include an aiming subsystem 600 for projecting an aiming pattern (not shown). Aiming subsystem 600 which can comprise a light source bank can be coupled to aiming light source bank power input unit 1208 for providing electrical power to a light source bank of aiming subsystem 600. Power input unit 1208 can be coupled to system bus 1500 via interface 1108 for communication with CPU 1060.

In use, terminal 1000 can be oriented by an operator with respect to a target, T, (e.g., a piece of paper, a package, another type of substrate) bearing decodable indicia 15 in such manner that illumination pattern 1260 is projected on a decodable indicia 15. In the example of FIGS. 1 and 4, decodable indicia 15 is provided by a 1D bar code symbol. Decodable indicia 15 could also be provided by a 2D bar code symbol or optical character recognition (OCR) characters. Decodable indicia 15 can be monochrome decodable indicia in which color is not utilized to encode information or decodable indicia 15 can be color decodable indicia in which color is utilized to encode information.

Light source bank electrical power input unit 1206 can provide energy to light source bank 500. Power input unit 1206 can be coupled to system bus 1500 for communication with CPU 1060 via interface circuit 1106. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination subsystem 800 for generating illumination pattern 1260.

In another aspect, terminal 1000 can include power supply 1402 that supplies power to a terminal power grid 1404 to which electrical components of terminal 1000 can be connected. Power supply 1402 can be coupled to various power sources, e.g., a battery 1406, a serial interface 1408 (e.g., USB, RS232), and/or AC/DC transformer 1410.

Terminal 1000 can also include a number of peripheral devices including trigger 1220 which may be used to make active a trigger signal for activating frame readout and/or certain decoding processes. Terminal 1000 can be adapted so that activation of trigger 1220 activates a trigger signal and initiates a decode attempt. Specifically, terminal 1000 can be operative so that in response to activation of a trigger signal, a succession of frames can be captured by way of read out of image information from image sensor pixel array 1033 (typically in the form of analog signals) conversion of the image information into digital format and then storage of the image information after conversion into memory 1080 (which can buffer one or more of the succession of frames at a given time). CPU 1060 can be operative to subject one or more of the succession of frames to a decode attempt.

For attempting to decode a bar code (a bar code symbol), e.g., a one dimensional bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. Where a bar code is provided by a color bar code information can be encoded utilizing the color scale of the bar code. One color symbology is HIGH CAPACITY COLOR BARCODE (HCCB) developed by Microsoft Corporation of Redmon, Wash. Other color bar code symbologies of which terminal 1000 can be adapted to decode include COLOR CODE developed by Color Zip Sea, Ltd., and ULTRACODE (Color) developed by Zebra Technologies. A specification for ULTRACODE symbology is available from the association for Automatic Identification and Mobility (AIM).

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1108 for coupling electrical power input unit 1208 to system bus 1500, interface circuit 1106 for coupling illumination light source bank power input unit 1206 to system bus 1500, and interface circuit 1120 for coupling trigger 1220 to system bus 1500. Terminal 1000 can also include a display 1222 coupled to system bus 1500 and in communication with CPU 1060, via interface 1122, pointer mechanism 1224 in communication with CPU 1060 via interface 1124 connected to system bus 1500 as well as keyboard 1226 in communication with CPU 1060 via interface 1126 connected to system bus 1500. Terminal 1000 can also include range detector unit 1210 coupled to system bus 1500 via interface 1110. In one embodiment, range detector unit 1210 can be an acoustic range detector unit. Various interface circuits of terminal 1000 can share circuit components. For example, a common microcontroller can be established for providing control inputs to both image sensor timing and control circuit 1038 and to power input unit 1206. A common microcontroller providing control inputs to circuit 1038 and to power input unit 1206 can be provided to coordinate timing between image sensor pixel array controls and illumination subsystem controls.

A succession of frames of image data that can be captured and subject to the described processing can be full frames (including pixel values corresponding to each pixel of image sensor pixel array 1033 or a maximum number of pixels read out from image sensor pixel array 1033 during operation of terminal 1000). A succession of frames of image data that can be captured and subject to the described processing can also be "windowed frames" comprising pixel values corresponding to less than a full frame of pixels of image sensor pixel array 1033. A succession of frames of image data that can be captured and subject to the described processing can also comprise a combination of full frames and windowed frames. A full frame can be read out for capture by selectively addressing pixels of image sensor 1032 having image sensor pixel array 1033 corresponding to the full frame. A windowed frame can be read out for capture by selectively addressing pixels of image sensor 1032 having image sensor pixel array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of terminal 1000 can be increased (and frame time decreased) by decreasing of a frame picture size.

Figure 4A:
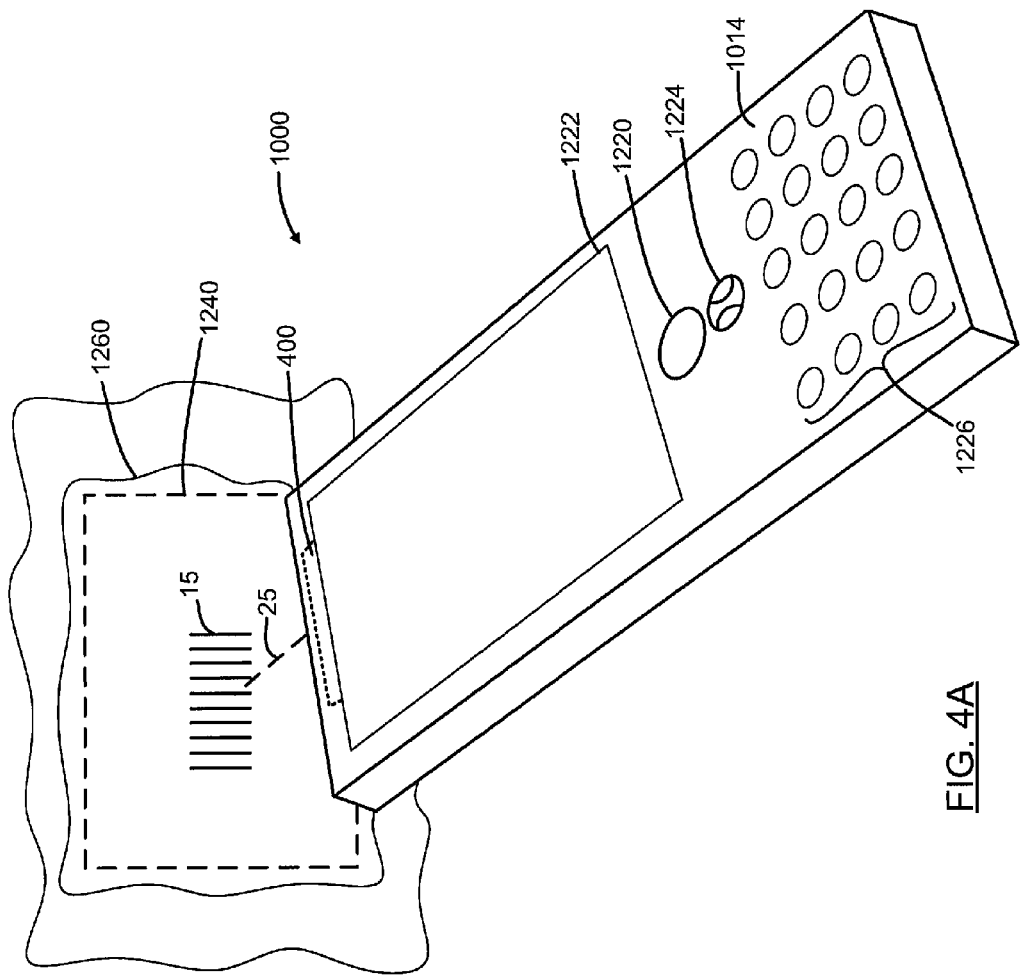
FIG. 4A is a perspective physical form view of an indicia reading terminal.

Further aspects of terminal 1000 in one embodiment are described with reference again to the physical form view of FIG. 4A. Trigger 1220, display 1222, pointer mechanism 1224, and keyboard 1226 can be disposed on a common side of a hand held housing 1014 as shown in FIG. 4. Display 1222 and pointer mechanism 1224 in combination can be regarded as a user interface of terminal 1000. Display 1222 in one embodiment can incorporate a touch panel for navigation and virtual actuator selection in which case a user interface of terminal 1000 can be provided by display 1222. A user interface of terminal 1000 can also be provided by configuring terminal 1000 to be operative to be reprogrammed by decoding of programming bar code symbols. A hand held housing 1014 for terminal 1000 can in another embodiment be devoid of a display and can be in a gun style form factor. Imaging module 400 including image sensor pixel array 1033 and imaging optical imaging assembly 200 can be incorporated in hand held housing 1014.

Figure 4B:
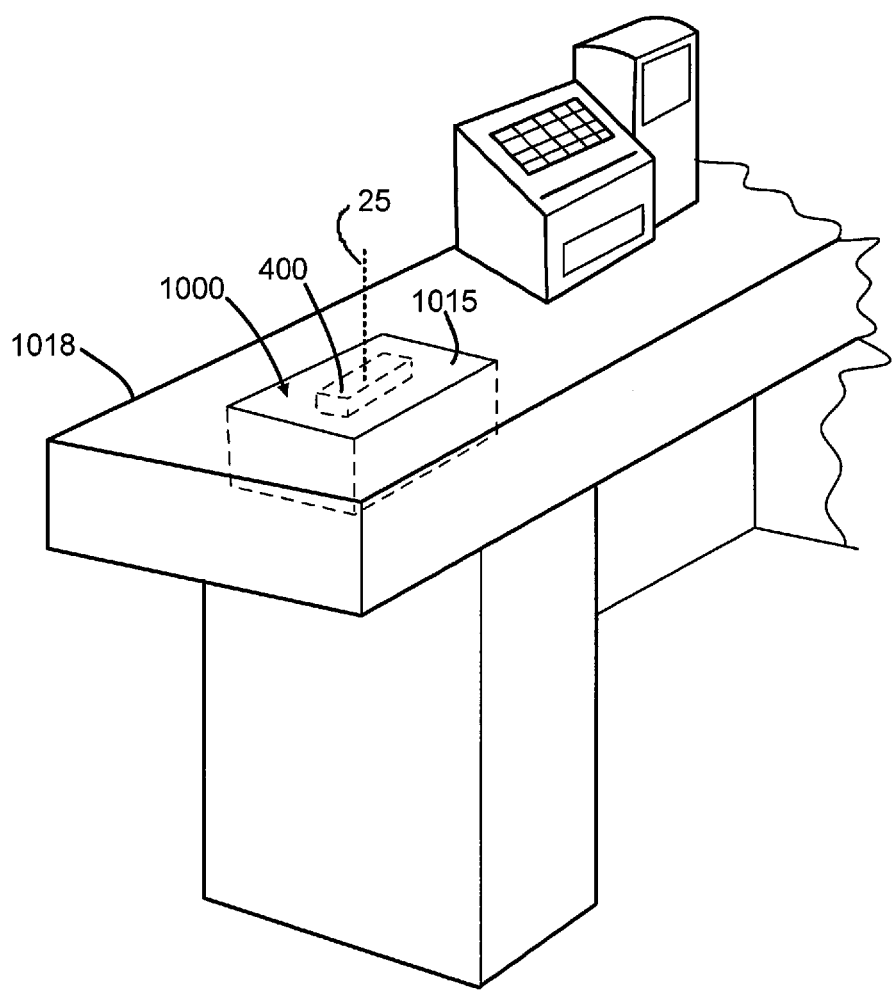
FIG. 4B is an implementation view of a fixed position indicia reading terminal.

In the implementation view of FIG. 4B, indicia reading terminal 1000 having fixed mount housing 1015 and imaging module 400 incorporated in housing 1015 is shown as being disposed at a point of sale. Indicia reading terminal 1000 in the implementation view of FIG. 4B is a fixed position and fixed mount indicia reading terminal that is mounted at a checkout counter. Indicia reading terminal 1000 having fixed mount housing 1015 can also be mounted e.g., at a ceiling above a conveyor belt. In one embodiment, terminal 1000 can be devoid of a housing such as housing 1014 or housing 1015 and can be provided by imaging module 400.

Figure 5:
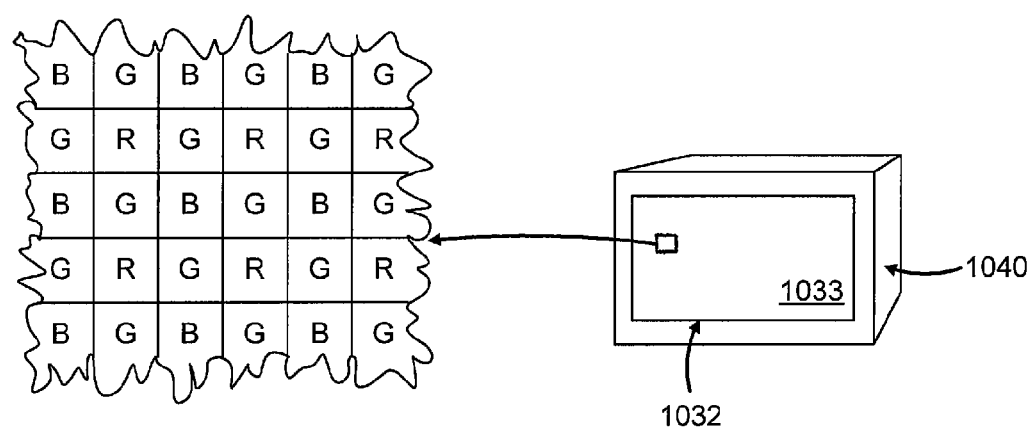
FIG. 5 is a schematic diagram of an image sensor integrated circuit having a Bayer pattern image sensor pixel array.

Referring to FIG. 5, aspects of image sensor 1032 in one embodiment are described in further detail. Image sensor pixel array 1033 in one embodiment, can be a Bayer pattern image sensor pixel array having a filter pattern as shown in FIG. 5. It has been described that image sensor pixel array 1033 can have a first set of pixels selectively transmitting light at a first wavelength and a second set of pixels selectively transmitting light at a second wavelength. The first and second wavelength can be narrow wavelength bands corresponding to a particular color of the visible color spectrum. Referring to the image sensor pixel array 1033, the first set of pixels can be regarded as one of the set of red pixels of array 1033 (designated with "R") the set of green pixels of array 1033 (designated with "G") or the set of blue pixels of array 1033 (designated with "B") and the second set of pixels of array 1033 can be regarded as another of a set of red, green and blue set pixels of image sensor pixel array 1033. A third set of pixels of array 1033 can be regarded as a remaining set of pixels of image sensor pixel array 1033 (red set, green set or blue set). A set of pixels having filters filtering in a particular visible color wavelength band can be regarded as a color set of pixels. In one embodiment, indicia reading terminal 1000 is operative to capture a frame of image data including image data corresponding to at least one of the first set of pixels or the second set of pixels, or the third set of pixels, wherein the indicia reading terminal is further operative for selectively utilizing image data of the frame corresponding to the first set of pixels for attempting to decode a decodable indicia. In one embodiment, image sensor pixel array 1033 can include a Bayer pattern of pixels having the filter pattern as shown in FIG. 5. Indicia reading terminal 1000 can be operative for capture of a frame of image data having both image data representing light on pixels of the first color set and image data representing light incident on pixels of the second color set. Indicia reading terminal 1000 can also be operative for capture of a frame of image data having image data representing light incident on one of the first color set or second color set of pixels. For example, indicia reading terminal 1000 can be operative for selectively addressing and reading out image data corresponding to one of the first set and the second set without addressing for readout pixels of the remaining set.

Figure 6:
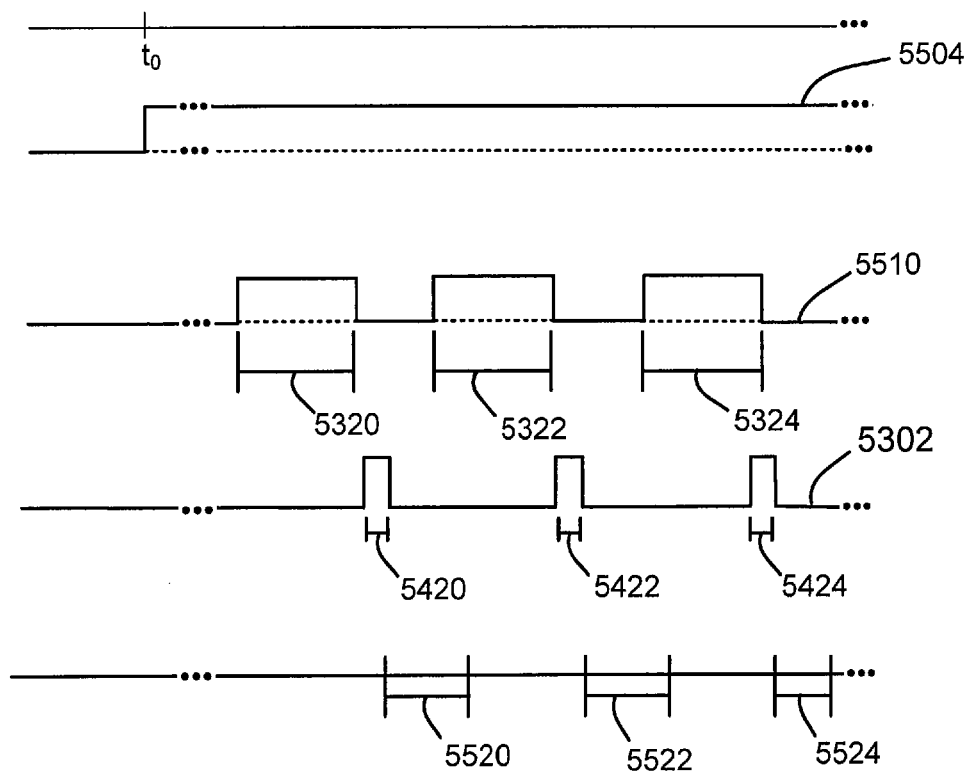
FIG. 6 is a timing diagram illustrating operation of an indicia reading terminal.

A timing diagram illustrating operation of indicia reading terminal 1000 for capture of three successive frames, N−1, N, N+1, is shown in FIG. 6. With reference to the timing diagram of FIG. 6, signal 5504 indicates a trigger signal. Trigger signal 5504 can be made active by actuation of a trigger 1220. Responsively to activation of trigger signal 5504, indicia reading terminal 1000 can capture a plurality of frames of image data.

Referring to the signal 5510, signal 5510 indicates exposure periods of indicia reading terminal 1000 with logic high periods of signal 5510 indicating exposure on periods and periods intermediate the logic high periods off periods of exposure. In an alternative embodiment, image sensor pixel array 1033 can be subject to continuous exposure as in a rolling shutter configuration. In the timing diagram of FIG. 6, periods 5320, 5322, 5324 indicate exposure periods of image sensor pixel array 1033. Indicia reading terminal 1000 can be operative to capture a frame of image data by reading out a frame of image data subjecting the image data of the frame to conversion, and storing the frame into memory 1080. Where a succession of frames are captured, the storing of frames can comprise buffering frames into a buffer memory location. After image sensor pixel array 1033 is exposed, charges accumulated at pixels of array 1033 can be read out, converted into digitized format, and stored into working volatile memory wherein respective frames can be subject to processing by CPU 1060.

With further reference to the timing diagram of FIG. 6, signal 5512 indicates readout signal having read out periods 5420, 5422, 5424 wherein charges accumulated at pixels of image sensor pixel array 1033 can be read out for conversion and storage to non-volatile memory 1080. Further reference to the timing diagram of FIG. 6, periods 5520, 5522, 5524 indicate processing periods of CPU 1060. During processing periods 5520, 5522, 5524, CPU 1060 can be subjecting captured frames of image data to processing for attempting to decode a decodable indicia. With reference to the timing diagram of FIG. 6, period 5320 can be an exposure period for frame N−1, period 5420 can be a readout period for frame N−1 and period 5520 can be a processing period for frame N−1, periods 5322, 5422 and 5522 can be exposure, readout and processing periods for frame N, and periods 5324, 5424, 5524 can be exposure, readout and processing periods for frame N+1.

Figure 7:
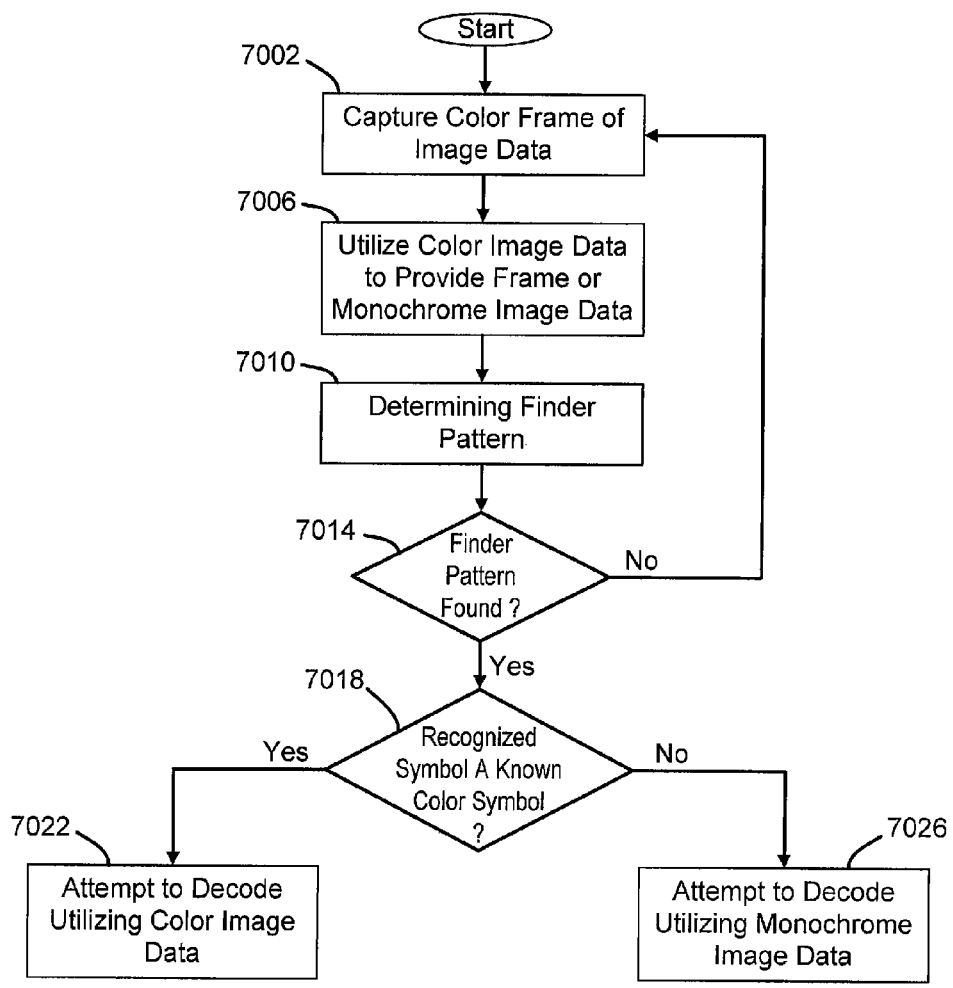
FIG. 7 is a flow diagram illustrating an exemplary method.

A flow diagram illustrating operation of terminal 1000 for decoding a bar code is shown in FIG. 7. At block 7002 terminal 1000 can capture a color frame of image data. Where image sensor array 1033 includes a Bayer pattern filter, the color frame of image data can be a mosaicized frame of image data. At block 7006, terminal 1000 can convert color image data of the color frame captured at block 7002 into monochrome image data while maintaining color image data. Color image data maintained at block 7006 can be maintained by maintaining the color frame of image data captured at block 7002 in a memory store. The memory store can be a set of address locations of system RAM 1080. At block 7010 terminal 1000 can utilize the monochrome image data provided at block 7006 for searching for a finder pattern. At block 7014 terminal 1000 can determine if a finder pattern is found and at block 7018 terminal 1000 can determine if a determined finder pattern is a finder pattern of a color bar code symbol. At block 7010 terminal 1000 can search for a finder pattern utilizing the monochrome frame of image data provided at block 7006.

If a color bar code symbol finder pattern is found terminal 1000 at block 7022 can utilize the color image data maintained at block 7006 for attempting to decode the color bar code symbol. If a monochrome bar code symbol finder pattern is found terminal 1000 can at block 7026 utilize the monochrome image data for attempting to decode the monochrome bar code symbol.

The searching utilizing monochrome image data for a color bar code symbol finder pattern can reduce a total decode time. If a monochrome bar code symbol finder pattern is found, monochrome image data can be utilized for decoding and there is no need to search for a finder pattern utilizing color image data. Color image data representative of a certain spatial area is relatively larger than a monochrome image data representative of that same spatial area and hence can be expected to consume a relatively longer time for processing. If a color bar code symbol is found a color bar code symbol can be successfully decoded utilizing color image data for decoding on an as needed basis and avoiding such utilization when unnecessary. Examples of color bar code symbols of which terminal 1000 can be adapted to decode include: HCCB developed by Microsoft Corporation, COLOR CODE developed by Color Zip Sea, Ltd., and ULTRACODE (COLOR) developed by Zebra Technologies.

There is set forth herein a terminal comprising: a color image sensor array having an associated color filter pattern; an optical imaging lens for focusing an image onto the image sensor array; wherein the terminal is operative for capture of a color frame of image data utilizing the color image sensor array; wherein the terminal is further operative for converting color image data of the frame to monochrome image data while maintaining color image data in a memory store; wherein the terminal is further operative for searching for a bar code symbol finder pattern utilizing the monochrome image data; wherein the terminal is further operative so that responsively to finding a color bar code symbol finder pattern utilizing the monochrome image data, the terminal utilizes the color image data for attempting to decode a color bar code symbol; and wherein the terminal is further operative so that responsively to finding a monochrome bar code symbol finder pattern utilizing the monochrome image data, the terminal utilizes the monochrome image data for attempting to decode a monochrome bar code symbol.

There is also set forth herein a method comprising: providing a terminal having a color image sensor array having an associated color filter pattern and an optical imaging lens for focusing an image onto the image sensor array; utilizing the terminal for capture of a color frame of image data; converting color image data of the frame to monochrome image data while maintaining color image data in a memory store; searching for a bar code symbol finder pattern utilizing the monochrome image data; responsively to finding a color bar code symbol finder pattern utilizing the monochrome image data, utilizing the color image data maintained in the memory store for attempting to decode a color bar code symbol; and responsively to finding a monochrome bar code symbol finder pattern utilizing the monochrome image data for attempting to decode a monochrome bar code symbol.

Referring to further aspects of block 7006 color image data can be converted into monochrome image data utilizing a number of alternative methods. A frame converted into monochrome image data can comprise eight bits per pixel image data. In one embodiment color imaging data can be converted into monochrome image data by utilizing only green pixel values of the color frame of image data. Missing pixel values of a green frame can be interpolated utilizing green pixel values. In one embodiment color imaging data can be converted into monochrome image data by utilizing only red pixel values of the color frame of image data. Missing pixel values of a red frame can be interpolated utilizing red pixel values.

In one embodiment, color imaging data can be converted into monochrome image data by utilizing only blue pixel values of the color frame of image data. Missing pixel values of a blue frame can be interpolated utilizing blue pixel values.

In one embodiment, color image data can be converted into monochrome image data by way of binning of pixel values. Pixel values of a color frame can be binned, resulting in a reduced resolution monochrome frame of image data.

For attempting to decode a color bar code symbol at clock 7002, terminal 1000 can utilize the location of a finder pattern determined at block 7006. For example, decoding can be performed utilizing pixel positions of the color frame of image data that are pixel positions about the finder pattern pixel positions located at block 7010. Pixel positions about a finder pattern can be regarded as a region of interest (ROI). A captured frame of image data captured at block 7002 can be a raw frame in a mosaic format in which a single color scale (e.g., red, green or blue) values are provided for each pixel position. Prior to subjecting a color frame of image data to a decode attempt, color image data of the frame can be subject to a demosaicing process. Color image data of a frame can be subjected to demosaicing by adding two additional color scale values for each pixel position of the frame. Within a Region of Interest (ROI) of a frame, red pixel values at green and blue pixel positions can be interpolated utilizing red pixel values at red pixel positions. Blue pixel values at red and green pixel positions can be interpolated utilizing blue pixel values at blue pixel position. Green pixel values at red and blue pixel position can be interpolated utilizing green pixel values at green pixel positions. Pixel positions of a Region of Interest (ROI) can be determined based on the symbology corresponding to the finder patterns so that the ROI is likely to comprise a complete symbol representation.

The bar code decoding method set forth herein reduces a time to decode bar code symbols. By utilizing color image data only on an as-needed basis in one embodiment, the time to decode is reduced. Use of monochrome data reduces a processing time relative to a processing time with use of color imaging data.

A processor, e.g., CPU 1060 can be employed for performing the method of FIG. 6. Prior to execution by CPU 1060, instructions for performance of the method of FIG. 7 can be stored on a tangible computer readable medium, e.g., memory 1082 and/or memory 1084. There is set forth herein a computer readable medium storing instructions for execution by a processor, the instructions for performance of the method described with reference to FIG. 7.

A small sample of systems methods and apparatus that are described herein is as follows:

A1. A terminal comprising:

a color image sensor array having an associated color filter pattern;

an optical imaging lens for focusing an image onto the image sensor array;

wherein the terminal is operative for capture of a color frame of image data utilizing the color image sensor array;

wherein the terminal is further operative for converting color image data of the frame to monochrome image data while maintaining color image data in a memory store;

wherein the terminal is further operative for searching for a bar code symbol finder pattern utilizing the monochrome image data;

wherein the terminal is further operative so that responsively to finding a color bar code symbol finder pattern utilizing the monochrome image data, the terminal utilizes the color image data for attempting to decode a color bar code symbol;

wherein the terminal is further operative so that responsively to finding a monochrome bar code symbol finder pattern utilizing the monochrome image data, the terminal utilizes the monochrome image data for attempting to decode a monochrome bar code symbol.

A2. The terminal of A1, wherein the terminal comprises a hand held housing encapsulating the image sensor array.

A3. The terminal of A1, wherein the terminal includes a manual trigger and wherein the terminal is operative so that the capture of the color frame of image data is responsive to a trigger signal activated responsively to actuation of the manual trigger.

A4. The terminal of A1, wherein the terminal is a fixed mount terminal.

A5. The terminal of A1, wherein the converting includes interpolating missing green pixel values.
A6. The terminal of A1, wherein the converting includes interpolating missing red pixel values.
A7. The terminal of A1, wherein the converting includes interpolating missing blue pixel values.
A8. The terminal of A1, wherein the converting includes subjecting the color frame of image data to 4×4 binning.
A9. The terminal of A1, wherein the memory store is provided by a set of address locations of a system RAM.
A10. The terminal of A1, wherein for attempting to decode a color bar code symbol the terminal selectively utilizes color image data within a Region of Interest (ROI) of the color image data, the ROI being established based on a location of the bar code symbol finder pattern.
B1. A method comprising:
   providing a terminal having a color image sensor array having an associated color filter pattern and an optical imaging lens for focusing an image onto the image sensor array;
   utilizing the terminal for capture of a color frame of image data;
   converting color image data of the frame to monochrome image data while maintaining color image data in a memory store;
   searching for a bar code symbol finder pattern utilizing the monochrome image data;
   responsively to finding a color bar code symbol finder pattern utilizing the monochrome image data, utilizing the color image data maintained in the memory store for attempting to decode a color bar code symbol;
   responsively to finding a monochrome bar code symbol finder pattern utilizing the monochrome image data for attempting to decode a monochrome bar code symbol.
B2. The method of B1, wherein the method includes actuating a manual trigger to initiate capture of the color frame of image data.
B3. The method of B1, wherein the converting includes interpolating missing green pixel values.
B4. The method of B1, wherein the converting includes interpolating missing red pixel values.
B5. The method of B1, wherein the converting includes interpolating missing blue pixel values.
B6. The method of B1, wherein the converting includes subjecting the color frame of image data to 4×4 binning.
B7. The method of B1, wherein the memory store is provided by a set of address locations of a system RAM.
B8. The method of B1, wherein the utilizing the color image data includes selectively utilizing color image data within a Region of Interest (ROI) of the color image data, the ROI being determined based on a location of the bar code symbol finder pattern.
C1. A computer readable medium comprising instructions for execution of a processor, the instructions for performance of the method comprising capturing into a memory a color frame of image data, converting image data of the frame into monochrome image data while maintaining color image data in a memory store, searching for a bar code symbol finder pattern utilizing the monochrome image data, responsively to a finding of the color bar code symbol finder pattern utilizing the color image data for attempting to decode, and, responsively to a finding of a monochrome bar code symbol finder pattern utilizing the monochrome image data for attempting to decode.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

I claim:

1. A computer readable medium comprising instructions for execution of a processor, the instructions for performance of the method comprising capturing a color frame of image data having red pixel values, green pixel values and blue pixel values, converting image data of the color frame of image data into monochrome image data while maintaining color image data in a memory store, searching for a bar code symbol finder pattern utilizing the monochrome image data, responsively to a finding of the color bar code symbol finder pattern utilizing the color image data for attempting to decode, and, responsively to a finding of a monochrome bar code symbol finder pattern utilizing the monochrome image data for attempting to decode.

2. The computer readable medium of claim 1, wherein the converting includes interpolating missing green pixel values.

3. The computer readable medium of claim 1, wherein the converting includes interpolating missing red pixel values.

4. The computer readable medium of claim 1, wherein the converting includes interpolating missing blue pixel values.

5. The computer readable medium of claim 1, wherein the converting includes using pixel values of the red pixel values, pixel values of the green pixel values, and pixel values of the blue pixel values.

6. The computer readable medium of claim 5, wherein the converting includes subjecting the color frame of image data to 4×4 binning.

* * * * *